United States Patent
Hatano et al.

(10) Patent No.: US 12,064,874 B2
(45) Date of Patent: Aug. 20, 2024

(54) WORK MACHINE UNIT AND ARTICULATED ROBOT

(71) Applicant: Hitachi Building Systems Co., Ltd., Tokyo (JP)

(72) Inventors: Toshiaki Hatano, Tokyo (JP); Daisuke Matsuka, Tokyo (JP); Makoto Hattori, Tokyo (JP); Masato Itou, Tokyo (JP)

(73) Assignee: HITACHI BUILDING SYSTEMS CO., LTD., Tokyo (JP)

( * ) Notice: Subject to any disclaimer, the term of this patent is extended or adjusted under 35 U.S.C. 154(b) by 728 days.

(21) Appl. No.: 17/270,466

(22) PCT Filed: Nov. 21, 2019

(86) PCT No.: PCT/JP2019/045628
§ 371 (c)(1),
(2) Date: Feb. 23, 2021

(87) PCT Pub. No.: WO2020/161988
PCT Pub. Date: Aug. 13, 2020

(65) Prior Publication Data
US 2021/0316444 A1    Oct. 14, 2021

(30) Foreign Application Priority Data
Feb. 6, 2019 (JP) ................. 2019-019572

(51) Int. Cl.
*B23B 47/00* (2006.01)
*B23B 49/00* (2006.01)
(Continued)

(52) U.S. Cl.
CPC ............. *B25J 9/1005* (2013.01); *B23B 47/00* (2013.01); *B23B 49/00* (2013.01); *B25J 11/005* (2013.01); *B25J 13/081* (2013.01); *B25J 15/0019* (2013.01)

(58) Field of Classification Search
CPC .. B25J 11/005; B25J 15/0095; B25J 15/0052; B23B 39/14; B23B 47/00; B23B 49/00
See application file for complete search history.

(56) References Cited

U.S. PATENT DOCUMENTS

| 5,299,894 A | 4/1994 | McCowin |
| 2018/0169813 A1 | 6/2018 | Wanner et al. |

(Continued)

FOREIGN PATENT DOCUMENTS

| CN | 107427868 A | 12/2017 |
| CN | 107771117 A | 3/2018 |

(Continued)

OTHER PUBLICATIONS

Chinese Office Action received in corresponding Chinese Application No. 201980055155.6 dated Jul. 20, 2023.

(Continued)

*Primary Examiner* — Alan Snyder
(74) *Attorney, Agent, or Firm* — MATTINGLY AND MALUR, PC (57) ABSTRACT

A work machine unit includes: a support member assembled to an end effector connection part of an operating machine; a work machine part assembled to one end of the support member; and a linear guide disposed at another end of the support member across its connection to the end effector connection part from the support member, arranged in parallel to an axial direction of the work machine part, and configured to abut against a work object or its peripheral structural object. Further, the linear guide is passed through a through-hole formed in the support member, and the support member is configured to move in the axial direction of the work machine part as guided by the linear guide.

15 Claims, 9 Drawing Sheets

(51) Int. Cl.
  *B25J 9/10* (2006.01)
  *B25J 11/00* (2006.01)
  *B25J 13/08* (2006.01)
  *B25J 15/00* (2006.01)

(56) References Cited

U.S. PATENT DOCUMENTS

| | | | |
|---|---|---|---|
| 2018/0326507 A1* | 11/2018 | Halvorsen | B23B 39/08 |
| 2018/0361571 A1* | 12/2018 | Georgeson | B25J 9/109 |
| 2019/0143511 A1* | 5/2019 | Kai | B25J 9/1694 700/254 |
| 2021/0039264 A1* | 2/2021 | Ishizuka | B25J 15/0019 |
| 2022/0001461 A1 | 1/2022 | Halvorsen et al. | |

FOREIGN PATENT DOCUMENTS

| | | |
|---|---|---|
| CN | 108637299 A | 10/2018 |
| EP | 1440773 A1 | 7/2004 |
| GB | 2473191 A | 3/2011 |
| JP | 60-249519 A | 12/1985 |
| JP | 63-120714 U | 8/1988 |
| JP | 01-164016 U | 11/1989 |
| JP | 02-036008 A | 2/1990 |
| JP | 2004-009228 A | 1/2004 |
| JP | 2018-516766 A | 6/2018 |
| WO | 2004/028755 A1 | 4/2004 |
| WO | 2004/050275 A2 | 6/2004 |
| WO | 2016/104700 A1 | 10/2017 |

OTHER PUBLICATIONS

Indian Office Action received in corresponding Indian Application No. 202117008227 dated Jan. 19, 2022.
Extended European Search Report received in corresponding European Application No. 19914232.4 dated Oct. 4, 2022.
International Search Report of PCT/JP2019/045628 dated Jan. 21, 2020.
Chinese Office Action received in corresponding Chinese Application No. 201980055155.6 dated Feb. 15, 2023.

* cited by examiner

WORK MACHINE UNIT AND ARTICULATED ROBOT

TECHNICAL FIELD

The present invention relates to a work machine unit and an articulated robot. Particularly, the present invention relates to a preferred work machine unit which is assembled to the articulated robot for performing a guide rail installation operation in an elevator shaft, and to a preferred articulated robot.

BACKGROUND ART

In developed countries such as Japan, North American countries and European countries, shrinking labor force for elevator installation associated with dwindling birthrate and an aging population has become problematic. This leads to a demand for achieving labor savings in the elevator installation work. Currently, the rail installation in the elevator is generally performed by workers who repeats a rail installation operation for each floor. Accordingly, the rail installation operation accounts for a major portion of the total working hours for the elevator installation work.

In this connection, study has been made on automation technology for rail installation operation utilizing robots and the like. However, a narrow and dark space in the elevator shaft imposes limitations on carrying-in, installation location, size, weight, handling, and the like of equipment for automating the rail installation operation (automated rail installation equipment).

The rail installation operation includes a variety of operations such as drilling holes for anchor bolts, striking anchor bolts, fastening bolts and nuts, arranging brackets, positioning and the like.

Hence, study has been made to apply a versatile articulated robot to the rail installation operation so as to cope with the different operations by replacing an end effector (such as a drilling machine) of the robot.

The conventional art of this kind is set forth in Japanese Patent Application Laid-Open No. 2004-9228 (PTL 1). PTL 1 discloses a structure where a drilling machine is assembled to a distal end of a robot arm. The patent literature also describes the following features. A drill is movably mounted to a base. A pressing body is pressed against an area around a drilling position on a workpiece (drilling object). A position of the pressing body in a front-back direction with respect to the base is detected. An axial position of the drill with respect to the base is also detected. Further, a feed of the drill with respect to the workpiece is determined based on the position of the pressing body and the position of the drill. The drill is operated by feed means according to a feed based on a positional relation of the drill relative to the workpiece.

CITATION LIST

Patent Literature

PTL 1: Japanese Patent Application Laid-Open No. 2004-9228

SUMMARY OF INVENTION

Technical Problem

The structure disclosed in the above PTL 1 pertains to the drilling machine intended for high-precision drilling or countersinking of the workpiece for use in structural objects such as aircraft, high-speed train cars, and automobiles. Hence, the drilling machine is designed only for rotation motion. During the drilling operation, the drilling machine is subjected to a relatively small reaction force while a relatively small moment is applied to each joint of the articulated robot.

On the other hand, in a case where holes for anchor bolts are drilled in surfaces of the elevator shaft made of concrete in order to install the rails, a drilling machine such as a hammer drill adapted for simultaneous rotation motion and hammering operation is generally employed as the drill.

Figure 14:
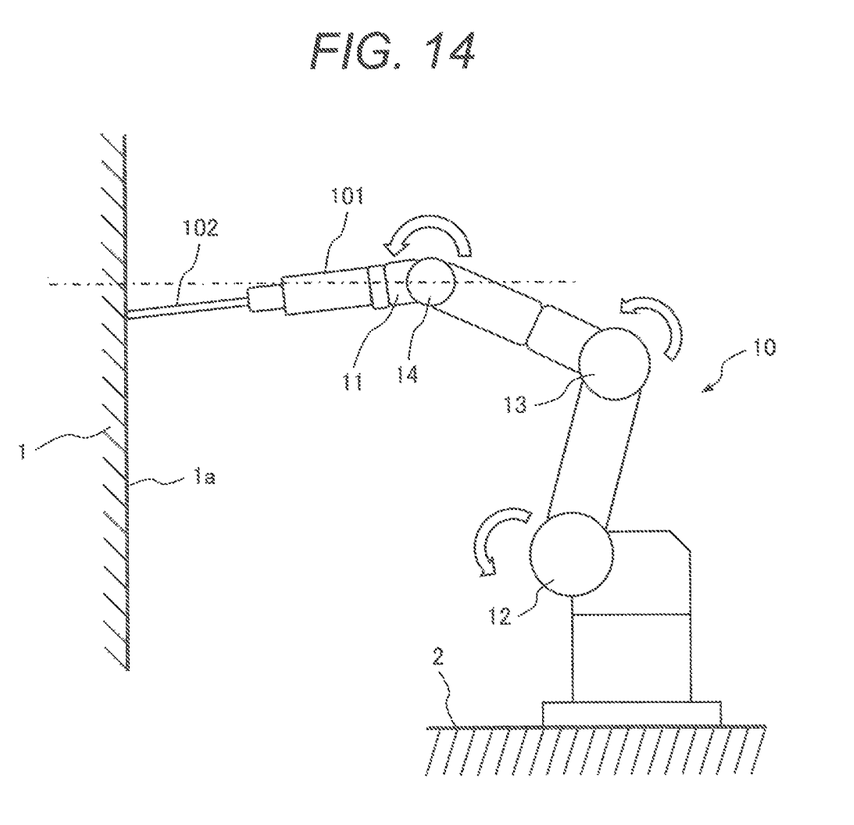
FIG. 14 is a front view showing a state where the drilling operation is performed by a drilling machine connected to the articulated robot.

A case where an operation of drilling holes in an object wall surface is performed using the articulated robot assembled with this drilling machine (hammer drill or the like) is described with reference to FIG. 14. FIG. 14 is a front view showing a state where a drilling machine (work machine part) 101 is assembled to an end effector connection part 11 of an articulated robot 10 installed on a robot ground contact surface 2 and the operation of drilling holes in a wall surface of a drilling object (work object) 1 is performed by using a drill bit 102 of the drilling machine 101.

Many of the drilling machines 101 have long length because they have a striking mechanism on a rotational axis of the drill. When the drilling machine is assembled to a distal end of the articulated robot, the articulated robot 10 supports the drilling machine 101 as located far away from a drilling position, as shown in FIG. 14. Further, in a case where a drilling angle of the drill bit 102 is not orthogonal to a wall surface 1a of the drilling object 1 as shown in the figure, individual joints 12, 13, 14 of the articulated robot 10 are subjected to large moment. The moment exceeding allowable moments of the joints 12, 13, 14 may create difficulty in performing the drilling operation.

Even if the drill bit 102 could be held against the drilling object 1 at right angles, it is difficult to control the articulate robot 10 to suppress a wobbling rotation of a tip of the drill bit 102 of the drilling machine 101 simultaneously performing the rotation operation and striking operation.

In a case where the articulated robot 10 is configured to increase the allowable moments of the joints, the articulated robot 10 is generally increased in size and weight. This makes it difficult to handle the articulated robot in the narrow and dark elevator shaft or the like.

Accordingly, an object of the present invention is to provide a work machine unit adapted to use a small articulated robot.

Another object of the present invention is to provide an articulated robot easy to handle even in the narrow and dark space.

Solution to Problem

According to an aspect of the present invention for achieving the above objects, a work machine unit includes: a support member assembled to an end effector connection part of an operating machine; a work machine part assembled to one end of the support member; and a linear guide disposed at another end of the support member across its connection to the end effector connection part from the support member, arranged in parallel to an axial direction of the work machine part, and configured to abut against a work object or its peripheral structural object, and has a structure wherein the linear guide is passed through a through-hole formed in the support member, and the support member is configured to move in the axial direction of the work machine part as guided by the linear guide.

According to another aspect of the present invention, a work machine unit includes: a Z-shaped support member assembled to an end effector connection part of an operating machine; a work machine part assembled to one end of the Z-shaped support member; a lower linear guide part which includes a linear guide disposed at another end of the support member across its connection to the end effector connection part from the Z-shaped support member, arranged in parallel to an axial direction of the work machine part, and configured to abut against a work object or its peripheral structural object; and an upper linear guide part which includes a pair of linear guides disposed at the one end of the Z-shaped support member in a manner to sandwich the work machine part therebetween, arranged in parallel to the axial direction of the work machine part, and configured to abut against the work object or its peripheral structural object, and has a structure wherein the individual linear guides are passed through through-holes formed in the support member, and the Z-shaped support member is configured to move in the axial direction of the work machine part as guided by the linear guides disposed at the one end and the other end of the support member, and the upper linear guide part includes: a linear guide base disposed at the linear guides on their work object sides; and a work machine part support member disposed between the linear guide base and the Z-shaped support member and used for mounting the work machine part, the work machine part support member is formed with through-holes and is also configured to move in the direction of rotational axis of the work machine part as guided by the linear guides, and an elastic body is respectively disposed between the work machine part support member and the linear guide base and between the Z-shaped support member and the work machine part support member.

According to yet another aspect of the present invention, an articulated robot includes: a plurality of joints; and a plurality of arms connected to the joints; and has a structure wherein an end effector connection part is disposed at the most distal one of the joints, and any one of the above-described work machine units is assembled to the end effector connection part.

Advantageous Effects of Invention

According to the present invention, the work machine unit adapted to use the small articulated robot is provided. Further, the articulated robot easy to handle even in the narrow and dark space is also provided.

DESCRIPTION OF EMBODIMENTS

Now, specific examples of the work machine unit and articulated robot according to the present invention are described as below with reference to the accompanying drawings. In the figures, like reference numerals refer to the same or similar components.

Example 1

Figure 1:
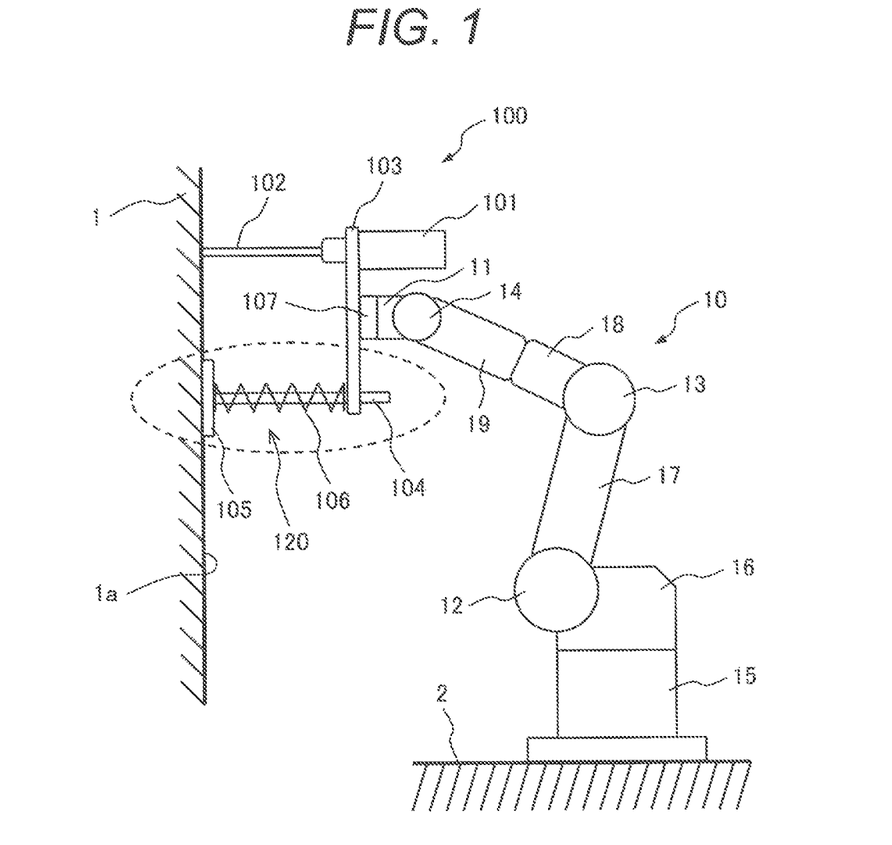
FIG. 1 is a front view showing a work machine unit and articulated robot according to Example 1 of the present invention.

A work machine unit and an articulated robot according to Example 1 of the present invention are described with reference to FIG. 1 to FIG. 7. FIG. 1 is a front view showing a work machine unit and articulated robot according to Example 1 of the present invention. First, a configuration of the articulated robot is described with reference to FIG. 1.

An articulated robot (operating machine) 10 includes: a base 15 installed on a robot ground contact surface 2; a body 16 pivotally constructed atop the base 15; a first arm 17 assembled to the body 16 via a joint 12; a second arm 18 and a third arm 19 assembled to the first arm 17 via a joint 13; and an end effector connection part 11 assembled to a distal end of the third arm 19 via a joint 14. The third arm is on the most distal side of the robot.

Each of the joints 12 to 14 is provided with a drive unit such as a motor and has a function to operate within a predetermined range. Thus, the individual arms are configured to swing. Namely, the operating functions of the joints permit the articulated robot 10 to change its overall posture including the arms to a posture required for accomplishing the operation and to move the end effector connection part 11 to a required position for accomplishing the operation.

Next, description is made on a specific example of a work machine unit 100 assembled to the end effector connection part 11 of the articulated robot 10. The work machine unit 100 of the example is a drill unit for forming an anchor bolt installation holes in a work object (drilling object) 1 such as wall or structural object. A drill unit (work machine unit) 100 includes: a drilling machine (work machine part) 101 such as a hammer drill; a drill bit 102 used as assembled to a distal end of the drilling machine 101 so as to drill holes in a wall surface 1a of the drilling object (work object) 1; and a support member 103 which fixes the drilling machine 101 in position and is assembled to the end effector connection part 11 of the articulated robot 10 via an elastic member 107 such as rubber, spring, or damper.

The drilling machine 101 is capable of any one or more of revolving motion, striking motion, and revolving/striking motion. In a case where the machine is capable of two or more of the motions, the machine is so configured as to be arbitrarily switched to any of the motions.

According to the example, the drilling machine 101 is attached to one end (upper end) of the support member 103. As illustrated in the dotted frame, a linear guide part 120 is disposed at another end (lower end) of the support member 103 across the end effector connection part 11. The linear guide part 120 includes a linear guide 104 disposed in parallel to a direction of rotational axis of the drilling machine 101. The linear guide 104 is passed through a through-hole formed in the support member 103. The support member 103 is configured to move in the direction of rotational axis of the drilling machine 101 as guided by the linear guide.

Specifically, the linear guide 104 is disposed on the opposite side from the drilling machine 101 with respect to the end effector connection part 11. The rotational axis of the drilling machine 101 and the linear guide 104 are in parallel to each other.

A linear guide base 105 is secured to the linear guide 104 on its end on the side of the wall surface 1a. An elastic body 106 such as spring or damper is disposed between the linear guide base 105 and the support member 103, biasing the linear guide 104 toward the wall surface 1a.

According to this example, the elastic body 106 is constituted by a coil spring, through which the linear guide 104 is inserted. One end the coil spring is secured to the support member 103 while the other end thereof is secured to the linear guide base 105. This prevents the linear guide 104 from dropping out from the support member 103 when the drill unit 100 is retreated from the wall surface 1a. Alternatively, the linear guide 104 may be prevented from dropping out from the support member 103 by assembling an anti-drop member such as nut or maintaining pin to the linear guide 104 at its end on the side of the anti-linear guide base 105.

Figure 2:
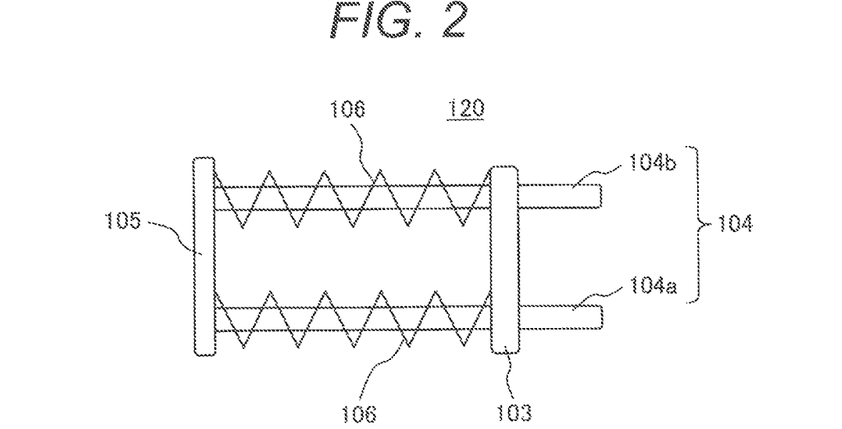
FIG. 2 is a plan view showing a linear guide part shown in FIG. 1.

FIG. 2 is a plan view showing the region enclosed by the dotted line in FIG. 1, or the linear guide part 120 including the linear guide 104. As shown in FIG. 2, the linear guide 104 according to this example includes a pair of linear guides 104a, 104b. Each of the paired linear guides 104a, 104b is provided with the elastic body 106. Further, each of the paired linear guides 104a, 104b is provided with the linear guide base 105 at its end on the side of the wall surface 1a. The support member 103 and the linear guide base 105 are configured to be in parallel to each other.

The above is the basic configuration of the drill unit 100. It is noted that in a case where a reaction force during a drilling operation is small, the elastic member 107 does not have to be disposed between the end effector connection part 11 and the support member 103 but the support member 103 may be directly assembled to the end effector connection part 11.

Figure 3:
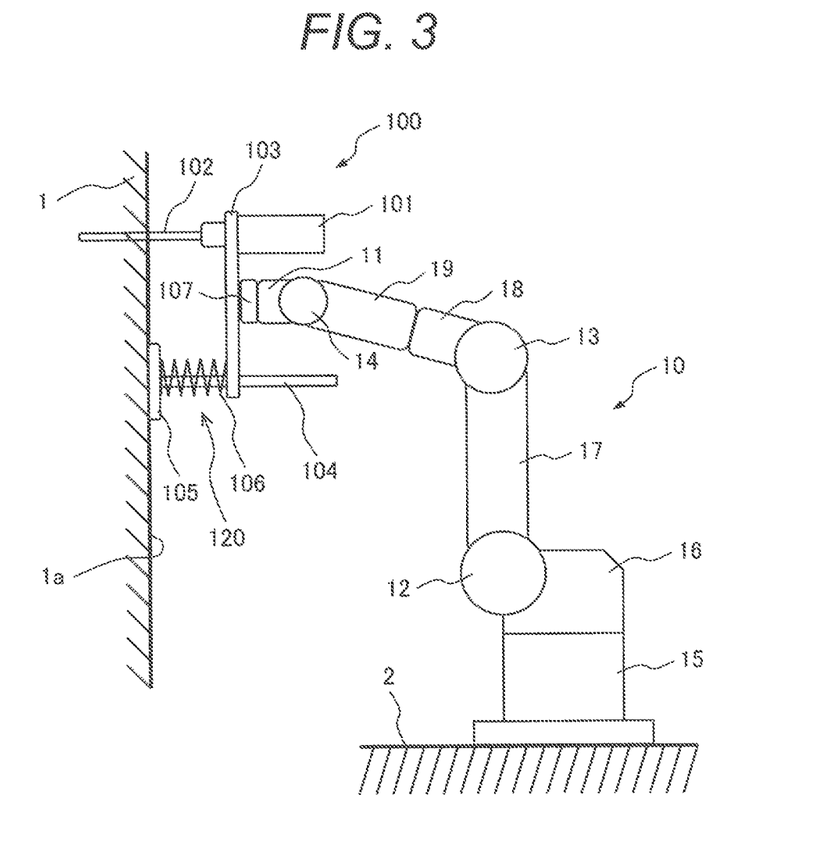
FIG. 3 is a front view illustrating a state where a drilling operation is performed using the work machine unit and the articulated robot shown in FIG. 1.

FIG. 3 is a front view illustrating a state where the drilling operation is performed by using the articulated robot 10 and the drill unit 100 shown in FIG. 1. Specifically, the figure shows the state where the drilling operation is performed by the articulated robot 10 in the posture shown in FIG. 1, which forces the drill unit 100 into a drilling object 1.

Because of the reaction force received by the drilling machine 101 from the drilling object 1, a moment tends to be applied to the articulated robot 10 via the end effector connection part 11 as a fulcrum. However, the machine unit of this example includes: the linear guide 104 connected to the robot via the support member 103; the linear guide base 105 assembled to the distal end of the linear guide 104 and pressed against the drilling object 1; and the elastic body 106. Hence, the linear guide part 120 acts to receive the moment produced by the drilling machine 101 and to reduce the moment applied to the end effector connection part 11. As a result, load on the joints 12 to 14 of the articulated robot 10 can be reduced.

The drilling machine 101 such as the hammer drill using the revolving motion and striking motion generates vibrations containing much high-frequency components in the direction of rotational axis. However, this example is configured such that the drilling machine is connected to the articulated robot 10 via the elastic member 107 such as spring or rubber. Therefore, the load on the individual joints 12 to 14 of the articulated robot 10 can be reduced by the elastic member 107 as well.

In a case where the wall surface 1a against which the linear guide base 105 is pressed has surface roughness, an elastic material such as rubber or sponge may be attached to an undersurface (surface contacting the drilling object 1 or its peripheral structural object) of the linear guide base 105 so as to permit the linear guide base to accommodate the surface roughness and to conform to the rough wall surface 1a. Further, the linear guide base 105 may also be provided with reinforcing steel detection means which detects the reinforcing steel or the like in the drilling object 1 by utilizing ultrasonic wave or electromagnetic induction.

The elastic body 106 mounted to the linear guide part 120 also plays a role in returning the linear guide base 105 to the original position before the drilling operation when the drill bit 102 is withdrawn from the drilling object 1. In place of the drill bit 102, an anchor bolt hammer may be assembled to the drilling machine 101 so that the drilling machine can drive in anchor bolts.

Further, the robot is adapted to drive the support member 103 forward with a constant force by mounting a dynamic sensor to the end effector connection part 11. When the drill bit 102 is brought into contact with a reinforcing steel bar, non-metallic hard material or the like which is embedded in concrete wall (drilling object 1), the relevant reaction force is also detected by the dynamic sensor. This makes it possible to obviate damages of the drill bit 102 and the like.

A tool changer may be connected to the end effector connection part 11 so that the drill bit can be replaced by a tool for performing an operation other than drilling.

Figure 4:
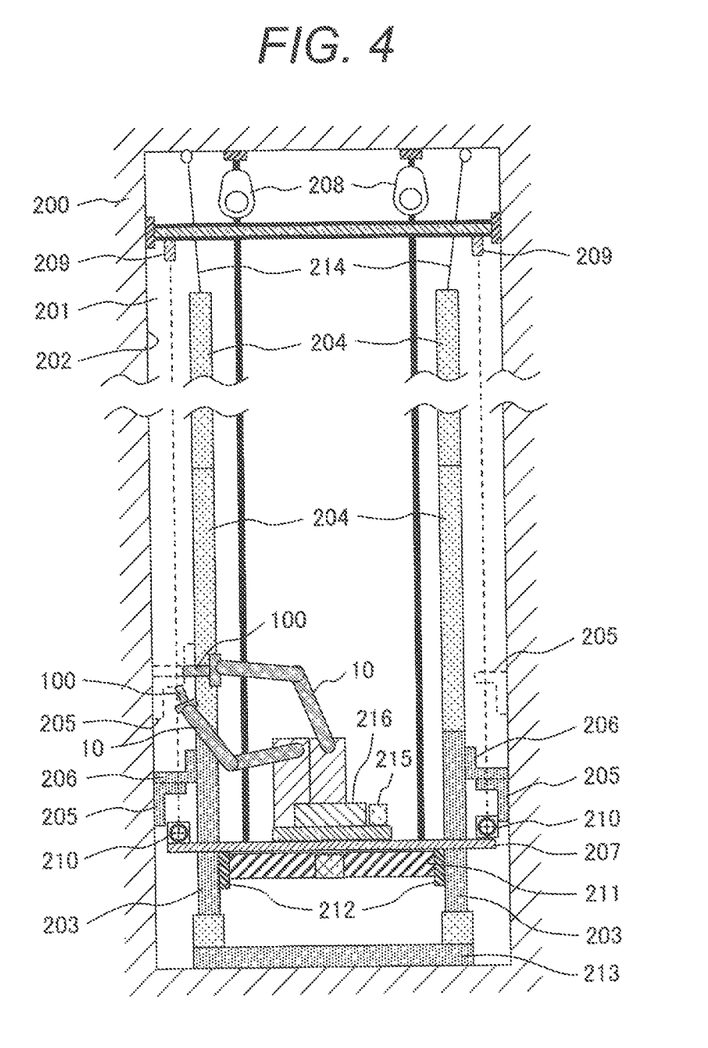
FIG. 4 is a schematic diagram illustrating an automatic rail installation apparatus in an elevator shaft.
Figure 5:
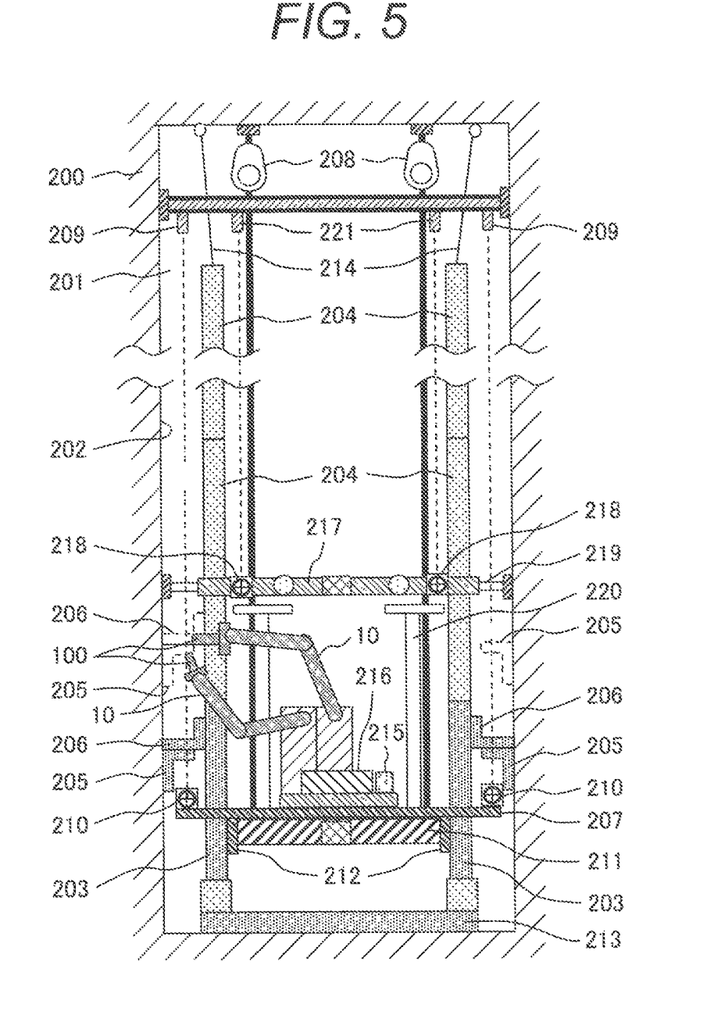
FIG. 5 is a schematic diagram illustrating another example of the automatic rail installation apparatus in the elevator shaft.

Next, an example where an automatic rail installation operation in the elevator shaft is performed by using the articulated robot is described with reference to FIGS. 4 and 5. FIG. 4 is a schematic diagram illustrating an automatic rail installation apparatus in the elevator shaft. FIG. 5 is a schematic diagram illustrating another example of the automatic rail installation apparatus in the elevator shaft.

Referring to FIG. 4, 201 indicates an elevator shaft which is disposed in a building 200 and in which an elevator is installed. 202 indicates a wall surface of the elevator shaft 201, on which (equivalent to the wall surface 1a of the drilling object 1 shown in FIG. 1) a guide rail 203 is installed. A lower guide rail 203 illustrated by a darker-shaded area is a guide rail fixed to the wall surface 202. A guide rail 204 illustrated by a light shaded area is a guide rail unfixed to the wall surface.

202 indicates a base bracket fixed to the wall surface 202 by means of the anchor bolts (not shown). 206 indicates a rail bracket fixed to the base bracket 205.

207 indicates a rail fixing unit for installation of the guide rails. The rail fixing unit 207 is configured to be moved up or down by a lifting machine 208 installed at an upper part of the elevator shaft 201.

The rail fixing unit 207 is provided with two articulated robots 10 as shown in FIG. 1. The articulated robots 10 are each assembled with the drill unit 100. The articulated robot 10 is configured to automatically perform the operation of drilling holes in the wall surface 202 into which the anchor bolts are driven and the operation of installing the base brackets 205 and the rail brackets 206.

In FIG. 4, 209 indicates a laser irradiator for defining a positional reference on the basis of which the guide rails 203, 204 are installed. 210 indicates a position detecting part for positioning the rail fixing unit 207 on the basis of a laser beam outputted from the laser irradiator 209. Further, a work base is indicated at 211, a guide shoe is indicated at 212. A rail template is indicated at 213. 214 indicates a wire for temporarily fixing in place the unfixed guide rail 204.

Also, a controller 215 for controlling the articulated robot 10 and the like, a parts box 216 accommodating therein parts such as anchor bolts, and the like are disposed on the rail fixing unit 207.

FIG. 5 illustrates another example of the automatic rail installation apparatus in the elevator shaft. According to this example, the automatic rail installation apparatus is equipped with a rail positioning unit. The apparatus has the same basic configuration as that shown in FIG. 4, except for that a rail positioning unit 217 is added. The rail positioning unit 217 is provided with a position detecting part 218 and a rail positioning device 219. 220 indicates a rail positioning unit connection part.

The apparatus of this example is also provided with a laser irradiator 221 for the rail positioning unit 217. The other components are the same as those shown in FIG. 4.

As shown in FIGS. 4 and 5, the operation of installing the guide rails in the elevator shaft 201 is performed in the narrow and dark space. Therefore, the articulated robot 10 and the drill unit 100 used for the installation operation of the guide rails must be downsized as much as possible.

To meet this demand, this example has a configuration as shown in FIG. 1, in which the drilling machine 101 is assembled to the one end (upper end) of the support member 103, and in which the linear guide part 120 including the linear guide 104 arranged in parallel to the direction of rotational axis of the drilling machine 101 is assembled to the other end (lower end) of the support member 103 across the end effector connection part 11, as illustrated in the dotted frame. This configuration permits at least a part of the drilling machine 101 to be located at place rearward of the end effector connection part 11, resulting in the reduction of the overall size of the articulated robot assembled with the drill unit 100. Accordingly, the example can provide an articulated robot easy to handle even in the narrow and dark space.

The drill unit 100 is provided with the linear guide part 120 so that the drill unit is adapted to reduce moment acting on the articulated robot 10. This leads to a drill unit (work machine unit) which permits the use of a small articulated robot 10 having a smaller allowable moment.

The example provides easy handling of the articulated robot 10 in the narrow and dark space when performing the operation such as the installation of the guide rails in the elevator shaft. Thus, the example facilitates the installation operation of the guide rails.

<Modification 1>

Figure 6:
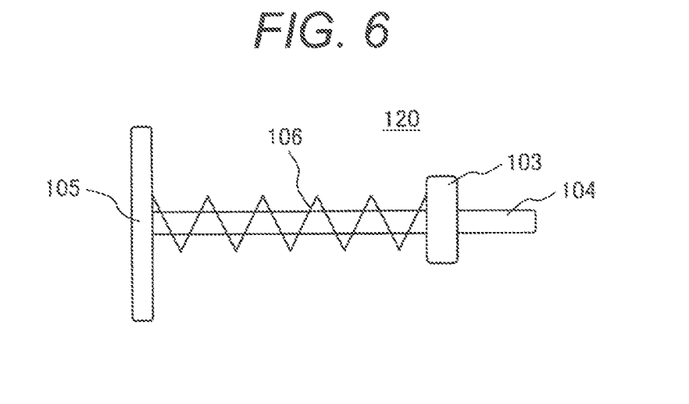
FIG. 6 is a plan view showing Modification 1 of the linear guide part shown in FIG. 1.

FIG. 6 is a plan view showing Modification 1 of the linear guide part 120 shown in FIG. 1. The linear guide part 120 described with reference to FIGS. 1 and 2 is constituted of a pair (two) of linear guides 104a, 104b. According to Modification 1, however, the linear guide part includes only one linear guide 104 assembled to the center of the lower end (opposite side from the drilling machine 101) of the support member 103, as shown in FIG. 6. In Modification 1, the linear guide part 120 is constituted by a single linear guide 104. This results in the reduction of the number of components and the weight reduction of the drill unit 100.

In the case of Modification 1, the linear guide base 105 may preferably be configured to have a larger contact area with the wall surface 1a such as to suppress lateral wavering of the linear guide part during the drilling operation.

The other components are the same as those of Example 1.

<Modification 2>

Figure 7:
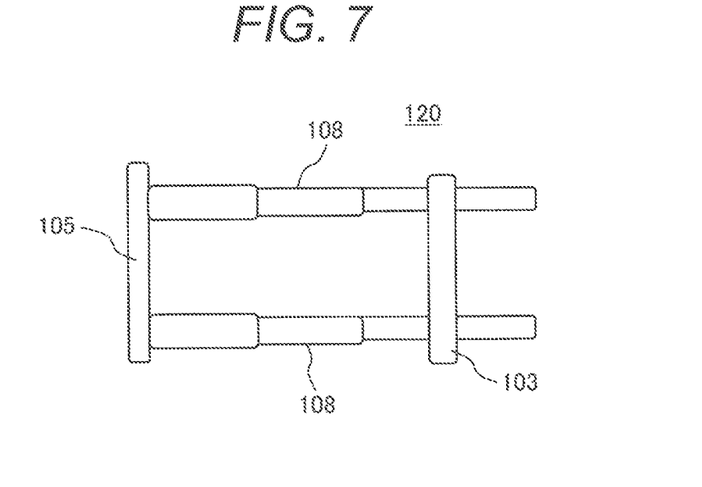
FIG. 7 is a plan view showing Modification 2 of the linear guide part shown in FIG. 1.

FIG. 7 is a plan view showing Modification 2 of the linear guide part shown in FIG. 1. The linear guide part 120 described with reference to FIGS. 1 and 2 is constituted using the rod-shaped linear guide 104 and the elastic body 106. Modification 2 uses a linear guide 108 constituted by an extendable air cylinder, as shown in FIG. 7.

The other components are the same as those of the above-described Example 1.

Example 2

Figure 8:
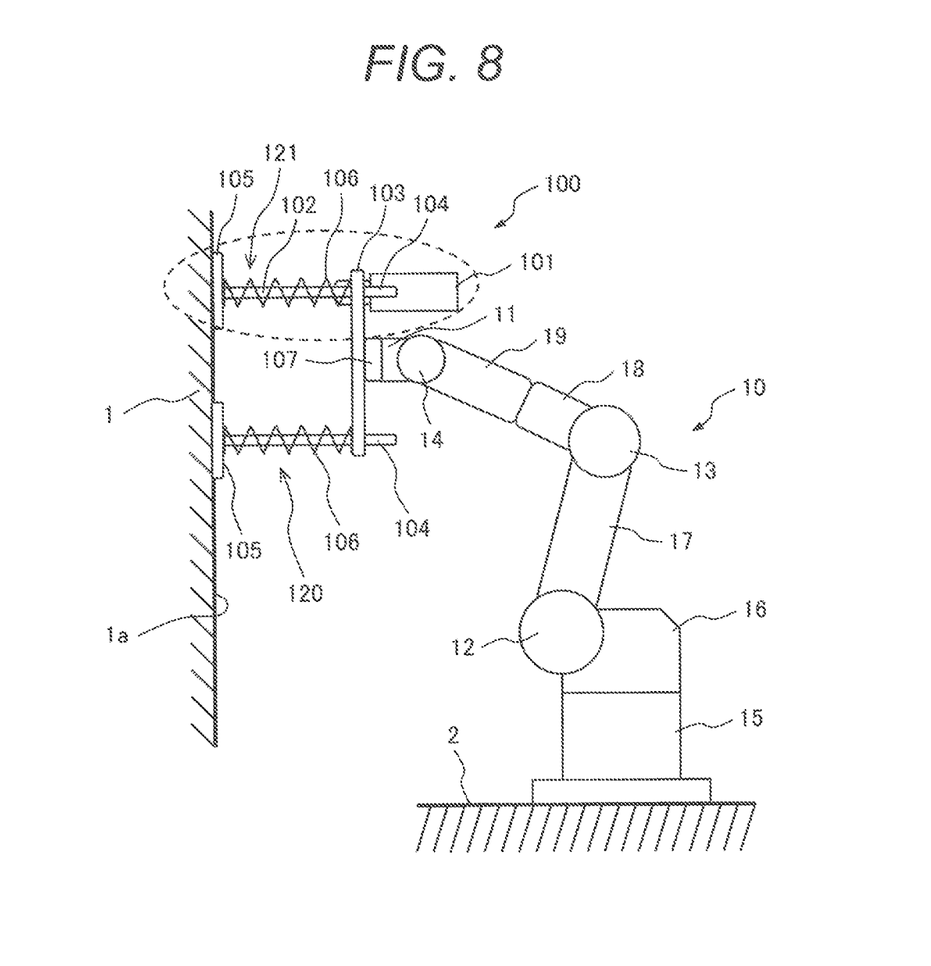
FIG. 8 is a front view showing a work machine unit and articulated robot according to Example 2 of the present invention.
Figure 9:
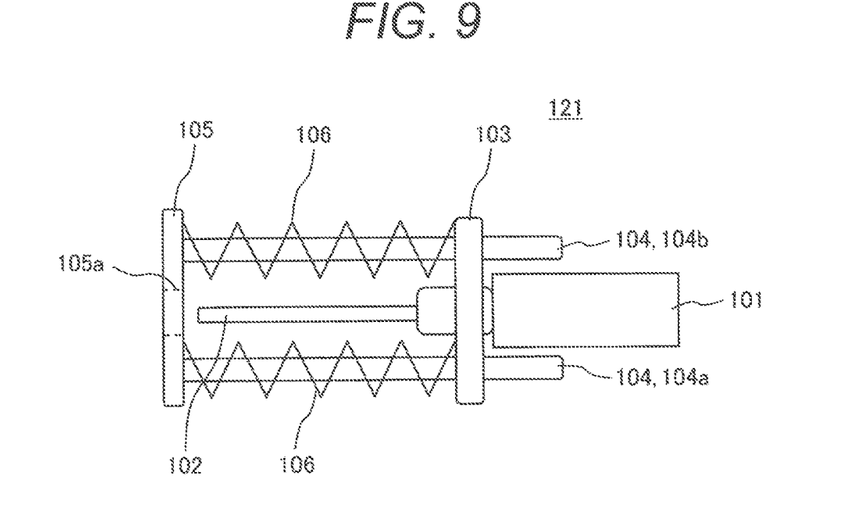
FIG. 9 is a plan view showing an upper linear guide part shown in FIG. 8.

Next, A work machine unit and an articulated robot according to Example 2 of the present invention are described with reference to FIGS. 8 and 9. FIG. 8 is a front view showing the work machine unit and articulated robot according to Example 2. FIG. 9 is a plan view showing an upper linear guide part shown in FIG. 8.

According to Example 2, the articulated robot 10 is configured the same way as that of Example 1 shown in FIG. 1. Further, the linear guide part 120 of the drill unit (work machine unit) 100 is also configured the same way as that of Example 1. Specifically, the drilling machine (work machine part) 101 is mounted to the one end (upper end) of the support member 103. The linear guide part 120 including the linear guide 104 arranged in parallel to the direction of rotational axis of the drilling machine 101 is assembled to the other end (lower end) of the support member 103 across the end effector connection part 11.

Example 2 differs from Example 1 in that the drilling machine (work machine part) 101 assembled to the one end (upper end) of the support member 103 is also provided with a linear guide part 121, as illustrated in the dotted frame in FIG. 8. As shown in FIG. 9, the linear guide part 121 includes: a pair of linear guides 104 (104a, 104b) assembled to the support member 103 in a manner to sandwich the drilling machine 101 therebetween; the linear guide base 105 assembled to the linear guide 104 at its end on the side of the wall surface 1a (see FIG. 8); and the elastic body 106 disposed between the linear guide base 105 and the support member 103.

The linear guides 104 disposed at the linear guide part 121 are also passed through the through-holes formed in the support member 103, so that the support member 103 is adapted to move in the direction of rotational axis of the drilling machine 101 as guided by the linear guides 104 of the linear guide part 121. According to this example, the support member 103 assembled with the drilling machine 101 is guided by means of the lower linear guide part 120 and the upper linear guide part 121. Hence, the support member 103 can be moved more accurately in the vertical direction with respect to the wall surface 1a of the drilling object (work object) 1. Accordingly, the drill bit 102 of the drilling machine 101 can also be moved more accurately in the vertical direction with respect to the wall surface 1a. Thus, the drilling machine can achieve the high-accuracy drilling operation on the wall surface 1a.

According to Example 2, the linear guide base 105 of the upper linear guide part 121 is formed with an aperture 105a at the center thereof or at position corresponding to the drill bit 102 such that the drill bit 102 is allowed to pass through the linear guide base. The other components are the same as those of the above-described Example 1.

According to Example 2, the same effects as those of Example 1 can be achieved. In addition, Example 2 can further suppress the wavering motion of the drilling machine 101 during the drilling operation by virtue of the additional linear guide part 121 disposed in vicinity to the drilling machine 101. Furthermore, Example 2 enables more accurate drilling operation on the wall surface 1a because the drilling machine can more accurately maintain the plumbness of the drill bit 102 with respect to the drilling object 1 by pressing, against the drilling object 1, the linear guide base 105 of the linear guide part 121 at the drilling machine 101.

Example 3

Figure 10:
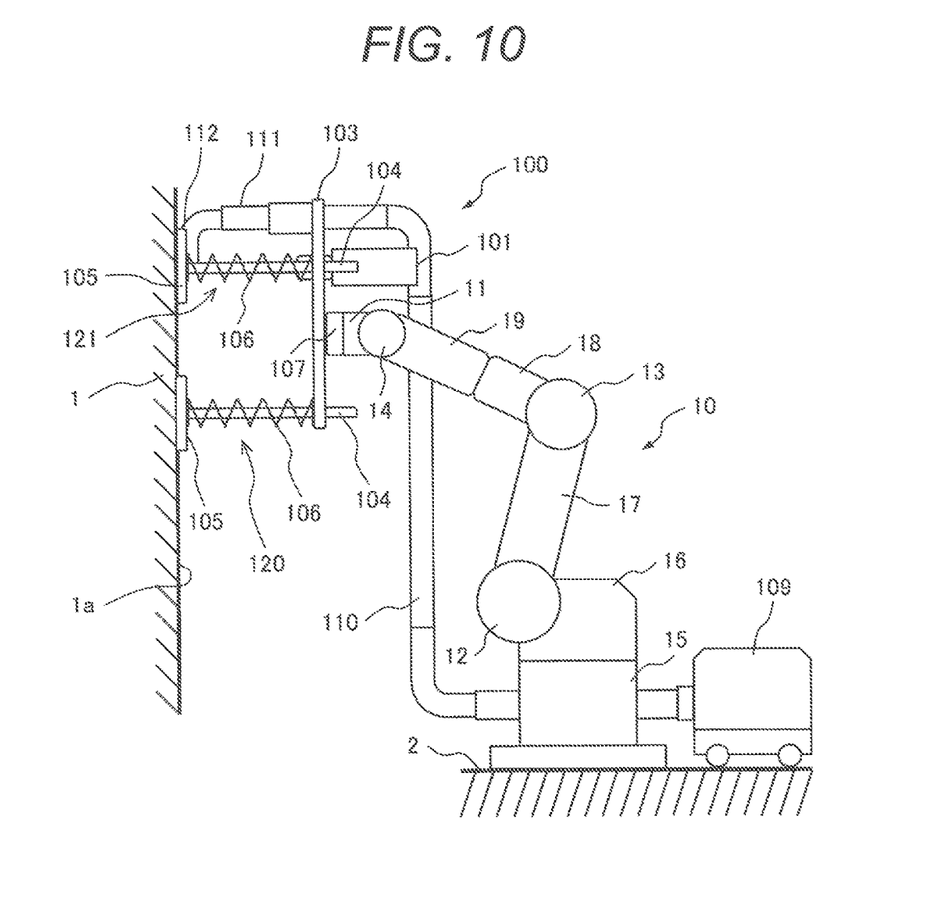
FIG. 10 is a front view showing a work machine unit and articulated robot according to Example 3 of the present invention.

A work machine unit and an articulated robot according to Example 3 of the present invention are described with reference to FIG. 10. FIG. 10 is a front view showing Example 3. In the figure, those components referred to by the equal or similar reference numerals to those used in FIGS. 1 and 8 described above represent the identical or similar components.

According to Example 3, a dust collecting device (dust collecting means) is added to the drill unit (work machine unit) 100 so as to suck powder dust produced during the drilling operation by the drilling machine (work machine part) 101, as shown in FIG. 10. The above-described dust collecting device includes: a dust collector 109 including a vacuum pump (suction pump) and the like; a flexible dust collecting hose 110 connected to the dust collector 109 and having flexibility and stretchability; a stretch hose 111 connected to the dust collecting hose and free to stretch in a moving direction of the support member 103; and a dust collecting port 112 connected to a distal end of the stretch hose 111 and disposed in vicinity of a drilled place.

A connection portion between the dust collecting hose 110 and the stretch hose 111 is attached to the support member 103. The support member 103 is pushed toward the drilling object 1 during the drilling operation by the drilling machine 101. The stretch hose 111 is configured to follow the movement of the support member 103. The stretch hose 111 is an extendable telescopic type, as shown in FIG. 10. The stretch hose is made stretchable/shrinkable by the use of an elastic body such as spring or can be constituted by a bellows-like hose incorporating an elastic body.

The other components are the same as those of the above-described Example 2.

According to Example 3, the same effects as those of Examples 1 and 2 can be achieved. Furthermore, Example 3 is adapted to prevent the powder dust produced during the drilling operation from permeating the narrow space such as the elevator shaft, and to achieve an effect to improve the working environment during the drilling operation or the like.

Example 4

Figure 11:
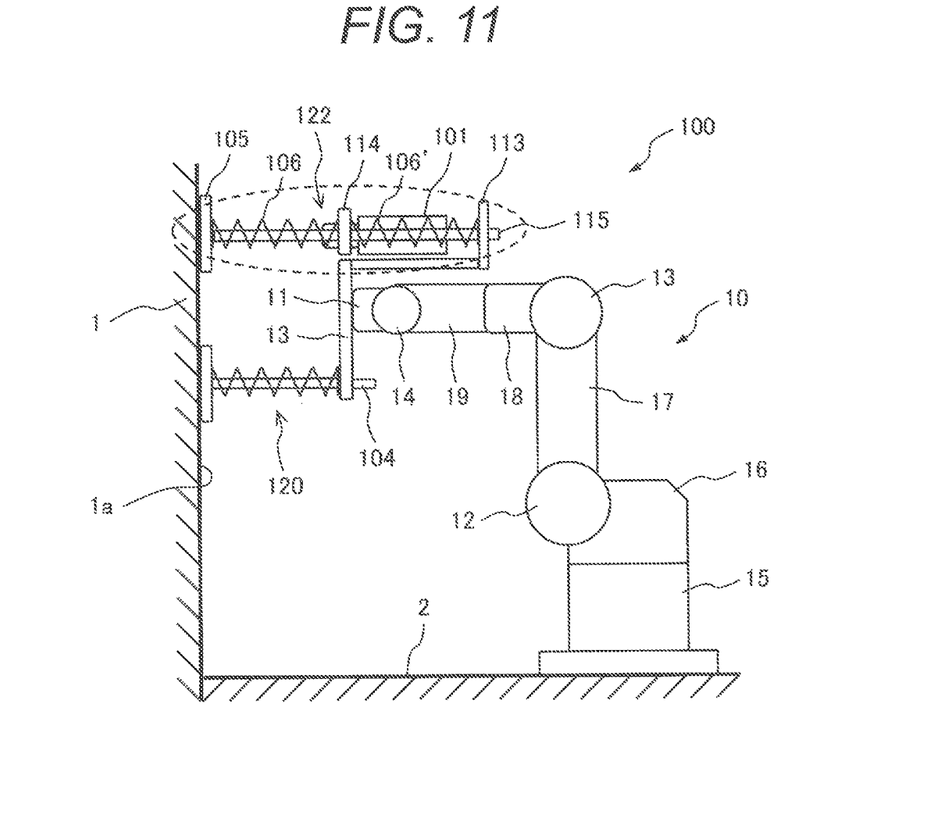
FIG. 11 is a front view showing a work machine unit and articulated robot according to Example 4 of the present invention.
Figure 12:
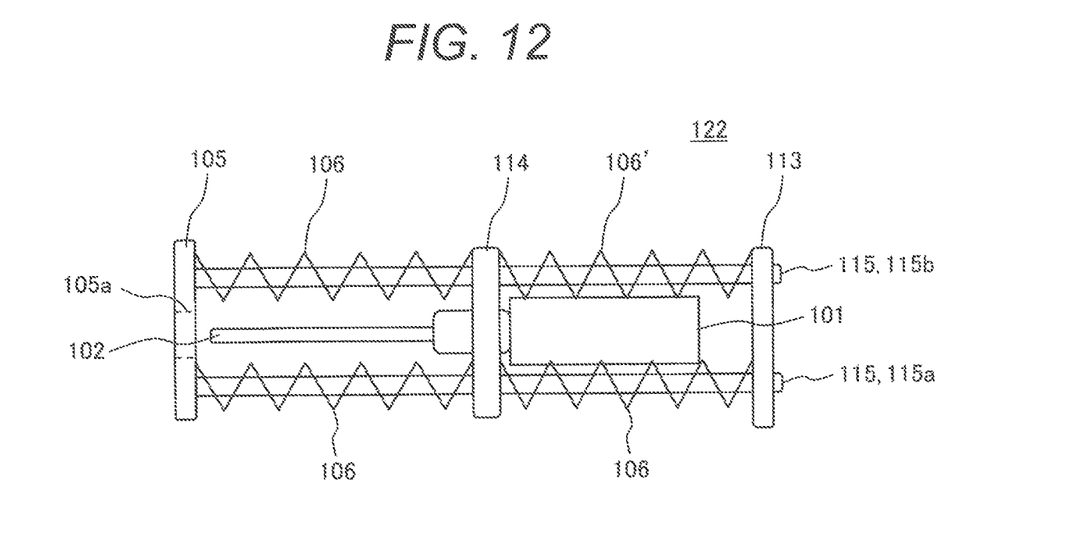
FIG. 12 is a plan view showing an upper linear guide part shown in FIG. 11.

A work machine unit and an articulated robot according to Example 4 of the present invention are described with reference to FIGS. 11 and 12. FIG. 11 is a front view showing Example 4. FIG. 12 is a plan view showing an upper linear guide part shown in FIG. 11. In the figures, those components referred to by the equal or similar reference numerals to those used in FIGS. 1, 8 and 9 described above represent the identical or similar components.

FIG. 11 shows the upper linear guide part, the configuration of which, as illustrated in the dotted frame in FIG. 8, is changed to that shown in FIG. 11 so as to further suppress the vibrations of the drilling machine 101 in the direction of rotational axis thereof. According to Example 4, the support member 103 shown in FIG. 8 is replaced by a Z-shaped support member 113. The linear guide part 120 similar to the one of the above-described Example 1 or 2 is disposed at a lower part of the Z-shaped support member 113. A linear guide part 122 which includes a linear guide 115 longer than the linear guide 104 of the linear guide part 120 is disposed at an upper part of the Z-shaped support member 113. The linear guide 115 is passed through a through-hole formed in the Z-shaped support member 113. The Z-shaped support member 113 is configured to move in the direction of rotational axis of the drilling machine (work machine part) 101 as also guided by the linear guide 115.

That is, the Z-shaped support member 113 is configured to move in the direction of rotational axis of the drilling machine 101 as guided by the linear guide 104 of the linear guide part 120 and the linear guide 115 of the linear guide part 122.

As shown in FIGS. 11 and 12, the linear guide base 105 is assembled to the linear guide 115 on its end on the side of the wall surface 1a of the drilling object (work object) 1. A work machine part support member (drilling machine support member) 114 for mounting the drilling machine 101 is disposed between the linear guide base 105 and the Z-shaped support member 113. This work machine part support member 114 is also formed with a through-hole. The work machine part support member 114 is also configured to move smoothly in the direction of rotational axis of the drilling machine 101 as guided by the linear guide 115.

The elastic body 106 such as spring or damper is disposed between the work machine part support member 114 and the linear guide base 105, while an elastic body 106' such as spring or damper is also disposed between the Z-shaped support member 113 and the work machine part support member 114. In this example as well, the linear guide part 122 is constituted by a pair of linear guides (ii5a, 115b), as shown in FIG. 12.

Because of the above-described configuration, the drilling machine 101 is adapted to perform the drilling operation by moving as guided by linear guide 115 while biasing the linear guides 104 and 115 toward the wall surface 1a. The drilling machine 101 is fixed to the work machine part support member 114 which is smoothly movable on the linear guide 104 and which has opposite ends clamped between the elastic bodies 106 and 106'. The drilling machine 101 is configured to be connected to the articulated robot 10 by means of the work machine part support member 114 and the Z-shaped support member 113. The other components are the same as those of the above-described Example 2.

As just described, this example is configured to suppress the vibrations transferred to the Z-shaped support member 113 by clamping the drilling machine 101 as a source of vibrations between the elastic bodies 106, 106' such as spring or damper.

Thus, Example 4 is adapted to achieve the same effects as those of the above-described Examples 1 and 2 and to suppress the vibrations transferred to the Z-shaped support member 113. Accordingly, the vibrations transferred to the articulated robot 10 can be even further reduced. Therefore, Example 4 also permits the omission of the elastic member 107 shown in the above-described FIGS. 1 and 8.

Example 5

Figure 13:
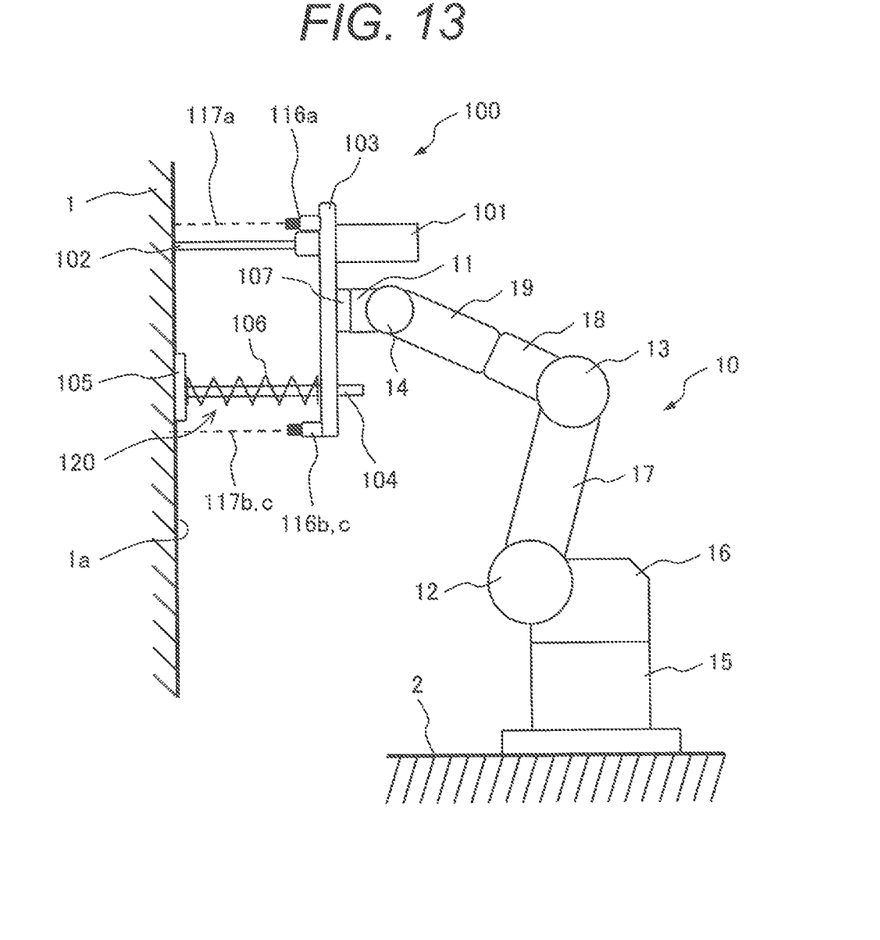
FIG. 13 is a front view showing a work machine unit and articulated robot according to Example 5 of the present invention.

A work machine unit and an articulated robot according to Example 5 of the present invention are described with reference to FIG. 13. FIG. 13 is a front view showing Example 5. In the figure, those components referred to by the equal or similar reference numerals to those used in FIG. 1 described above represent the identical or similar components.

Example 5 has the same basic configuration as that of the above-described Example 1. As shown in FIG. 13, Example 5 is characterized by adding distance sensors 116a, 116b, 116c to the configuration of Example 1. The distance sensor 116a is mounted to the support member 103 in vicinity of the drilling machine (work machine part) 101. The distance sensor 116b is mounted to the support member 103 in vicinity of the linear guide 104a (see FIG. 2). The distance sensor 116c is mounted to the support member 103 in vicinity of the linear guide 104b (see FIG. 2).

These distance sensors 116a to 116c are for measuring a distance between the support member 103 and the wall surface 1a of the drilling object (work object) 1. The angle of the joint 14 at the distal end of the articulated robot 10 is controlled so as to equalize distances 117a, 117b, 117c detected by the distance sensors 116a to 116c. This permits the support member 103 to be controllably directed parallel to the wall surface 1a. Therefore, the articulated robot enables the drilling machine 101 to perform the drilling operation and the like while accurately maintaining the drill bit 102 thereof at right angle to the wall surface 1a.

The other components are the same as those of the above-described Example 1.

According to Example 5, the same effects as those of the above-described Example 1 can be achieved. In addition, the distance sensors 116a to 116c are provided for measuring distances to three different points so that the plumbness of the drilling machine 101 with respect to the wall surface 1a can be maintained more accurately.

Usable examples of the above-described distance sensors 116a to 116c include non-contact type using laser beams or ultrasonic waves, contact type using linear potentiometer, and the like but are not limited to these.

According to the above-described examples of the present invention, the work machine unit is removably connected to the distal end of the articulated robot and configured as illustrated by the respective examples. In the drilling operations and the like using the articulated robot, the present invention can reduce the reaction force or moment transferred from the end effector to the articulated robot and can also maintain the plumbness of the work machine part. Accordingly, even the small articulated robot having a small allowable moment at the joints is capable of performing the drilling operation. Thus, the present invention provides the drill unit which can use the small articulated robot.

Further, the present invention also permits at least a part of the work machine part (drilling machine) to be disposed at place rearward of the end effector connection part (the opposite side from the work object). It is therefore possible to reduce the overall size of the articulated robot assembled with the work machine unit. Thus, the articulated robot easy to handle even in the narrow and dark space such as the elevator shaft is provided. In addition, the end effector is replaceable so that the robot is adaptable to operations other than drilling (such as striking anchor bots, fastening bolts and nuts, arranging brackets, and positioning).

It is noted that the present invention is not limited to the above-described examples but can include a variety of modifications. For example, the above examples have been described by way of the configuration using the drilling machine such as a hammer drill as the end effector used in the work machine unit. However, the present invention is not limited to the drilling machine but is similarly applicable to devices using the end effector performing a variety of operations such as striking anchor bolts, fastening bolts and nuts, arranging brackets, positioning, and the like. The above-described examples illustrate the configuration where the linear guide is provided with the elastic body. Even in a case where the linear guide is not provided with the elastic body, however, the effect of maintaining the plumbness of the work machine part with respect to the wall surface can be achieved. One component of one example can be replaced by one component of another example. A part of the configuration of one example permits addition of a part of the configuration of another example. The above-described examples are specifically described for greater clarity of the present invention. The present invention is not necessarily limited to what includes all the described components.

REFERENCE SIGNS LIST

1 . . . work object (drilling object)
1a . . . wall surface
2 . . . robot ground contact surface
10 . . . articulated robot (operating machine),
11 . . . end effector connection part
12 to 14 . . . joint,
15 . . . base,
16 . . . body,
17 . . . first arm,
18 . . . second arm,
19 . . . third arm,
100 . . . work machine unit (drill unit),
101 . . . work machine part (drilling machine),
102 . . . drill bit,
103 . . . support member,
104, 104a, 104b . . . liner guide,
105 . . . linear guide base,
105a . . . aperture,
106, 106' . . . elastic body,
107 . . . elastic member,
108 . . . linear guide (air cylinder),
109 . . . dust collector,
110 . . . dust collecting hose,
111 . . . stretch hose,
112 . . . dust collecting port,
113 . . . Z-shaped support member,
114 . . . work machine part support member (drilling machine support member), 115, 115a, 115b . . . linear guide,
116a to 116c . . . distance sensor,
117a to 117c . . . distance,
120, 121, 122 . . . linear guide part,
200 . . . building,
201 . . . elevator shaft,
202 . . . wall surface,
203, 204 . . . guide rail,
205 . . . base bracket,
206 . . . rail bracket,
207 . . . rail fixing unit,
208 . . . lifting machine,
209, 221 . . . laser irradiator,
210, 218 . . . position detecting part,
211 . . . work base,
212 . . . guide shoe,
213 . . . rail template,
214 . . . wire,
215 . . . controller,
216 . . . parts box,
217 . . . rail positioning unit,
219 . . . rail positioning device,
220 . . . rail positioning unit connection part.

The invention claimed is:

1. A work machine unit comprising:
a support member assembled to an end effector connection part of an operating machine;
a work machine part assembled to one end of the support member on one side of the end effector connection part; and
a linear guide disposed at another end of the support member on another side of the end effector connection part opposite the one side, arranged in parallel to an axial direction of the work machine part, and configured to abut against a work object or its peripheral structural object,
wherein the linear guide is passed through a through-hole formed in the support member, and the support member is configured to move in the axial direction of the work machine part as guided by the linear guide.

2. The work machine unit according to claim 1, further comprising at least one of an elastic body and a damper disposed at the linear guide.

3. The work machine unit according to claim 1, further comprising a linear guide base secured to the linear guide at an end on a work object side,
wherein the linear guide base is configured to abut against the work object or its peripheral structural object.

4. The work machine unit according to claim 3, wherein the linear guide base is provided with an elastic material accommodating surface unevenness at its end face on the work object side.

5. The work machine unit according to claim 1, wherein an elastic member is disposed between the support member and the end effector connection part.

6. The work machine unit according to claim 1, wherein the linear guide is provided in a pair at the another end of the support member.

7. The work machine unit according to claim 1,
wherein a pair of the linear guides is also disposed at the one end of the support member in a manner to sandwich the work machine part therebetween, and the linear guides are arranged in parallel to the axial direction of the work machine part, configured to abut against the work object or its peripheral structural object, and passed through a through-hole formed in the support member, and
the support member is configured to move in the axial direction of the work machine part as guided by the linear guides disposed at the one end and the other end of the support member.

8. The work machine unit according to claim 1, wherein the operating machine is an articulated robot, and the support member is assembled to the end effector connection part of the articulated robot.

9. The work machine unit according to claim 8, wherein the work machine part is a drilling machine.

10. The work machine unit according to claim 9,
wherein the support member is provided with distance sensors at least at three points thereof, and the drilling machine is controlled by the articulated robot so that the drilling machine is directed at a right angle to a wall surface of the work object.

11. The work machine unit according to claim 8, wherein the work machine part is configured to strike anchor bolts.

12. An articulated robot comprising:
a plurality of joints; and
a plurality of arms connected to the joints,
wherein an end effector connection part is disposed at the most distal one of the arms, and
the work machine unit according to claim 1 is assembled to the end effector connection part.

13. The articulated robot according to claim 12, wherein the end effector connection part is provided with a dynamic sensor.

14. The articulated robot according to claim 12, further comprising dust collecting means for collecting powder dust produced during an operation performed by the work machine part.

15. A work machine unit comprising:
a Z-shaped support member assembled to an end effector connection part of an operating machine;
a work machine part assembled to one end of the Z-shaped support member on one side of the end effector connection part;
a lower linear guide part which includes a linear guide disposed at another end of the support member on another side of the end effector connection part opposite the one side, arranged in parallel to an axial direction of the work machine part, and configured to abut against a work object or its peripheral structural object; and
an upper linear guide part which includes a pair of linear guides disposed at the one end of the Z-shaped support member in a manner to sandwich the work machine part therebetween, arranged in parallel to the axial direction of the work machine part, and configured to abut against the work object or its peripheral structural object,
wherein the individual linear guides are passed through through-holes formed in the support member, and the Z-shaped support member is configured to move in the axial direction of the work machine part as guided by the linear guides disposed at the one end and the other end of the support member, and
the upper linear guide part includes: a linear guide base disposed at the linear guides on their work object sides; and a work machine part support member disposed between the linear guide base and the Z-shaped support member and used for mounting the work machine part, the work machine part support member is formed with through-holes and is also configured to move in the direction of rotational axis of the work machine part as guided by the linear guides, and an elastic body is respectively disposed between the work machine part support member and the linear guide base and between the Z-shaped support member and the work machine part support member.

* * * * *